(12) United States Patent
Kohashi et al.

(10) Patent No.: US 6,655,421 B2
(45) Date of Patent: Dec. 2, 2003

(54) WEIGHT-BASED, MULTIPLE FILLER FILLING MACHINE

(75) Inventors: Toru Kohashi, Akashi (JP); Yoshiyuki Ishisaka, Akashi (JP)

(73) Assignee: Yamato Scale Company, Limited, Hyogo-ken (JP)

( * ) Notice: Subject to any disclaimer, the term of this patent is extended or adjusted under 35 U.S.C. 154(b) by 14 days.

(21) Appl. No.: 10/131,705

(22) Filed: Apr. 24, 2002

(65) Prior Publication Data

US 2003/0041916 A1 Mar. 6, 2003

(30) Foreign Application Priority Data

Aug. 29, 2001 (JP) ........................................ 2001-259719

(51) Int. Cl.⁷ ................................................ B65B 1/30
(52) U.S. Cl. ........................................ 141/83; 141/145
(58) Field of Search ................ 141/83, 145; 177/25.13, 177/211, 229

(56) References Cited

U.S. PATENT DOCUMENTS

| | | |
|---|---|---|
| 4,582,102 A | 4/1986 | Risser |
| 4,815,547 A | 3/1989 | Dillon et al. |
| 4,974,679 A | 12/1990 | Reuter |
| 5,700,982 A * | 12/1997 | Neuman ...................... 141/83 |
| 2001/0034671 A1 * | 10/2001 | Luke et al. |

FOREIGN PATENT DOCUMENTS

| | | | |
|---|---|---|---|
| CH | SE 514912 C | * | 5/2001 |
| EP | 0080826 A2 | * | 6/1983 |
| EP | 0319176 A | | 6/1989 |
| EP | 0725035 A1 | * | 8/1996 |
| JP | 61182528 A | | 8/1986 |
| JP | 01291120 A | | 11/1989 |

* cited by examiner

*Primary Examiner*—Gene Mancene
*Assistant Examiner*—Khoa Huynh
(74) *Attorney, Agent, or Firm*—Senniger, Powers, Leavitt & Roedel

(57) ABSTRACT

A weight-based, multiple filler filling machine has a simplified wiring arrangement. The filling machine fills a plurality of bottles with a predetermined amount in weight of an article through associated ones of a plurality of valves. The weight of the article placed in each of the bottles is measured by a load cell. An arithmetic unit is mounted on the surface of or inside each load cell for determining the weight level of the article as measured by that load cell and controlling the associated valve in accordance with the determined weight level.

9 Claims, 10 Drawing Sheets

WEIGHT-BASED, MULTIPLE FILLER FILLING MACHINE

This invention relates to a multiple filler filling machine operating on a weight-base, to fill containers, such as bags, bottles and boxes, with a predetermined amount by weight of an article in the form of, for example, liquid, powder or particles, and, more particularly, to a weight measuring system which may be employed for such filling machine.

BACKGROUND OF THE INVENTION

A multiple filler filling machine of the above-described type typically includes a plurality of fillers or filling devices for filling a plurality of containers with an article in parallel, in series or at random. An example of weight-based, multiple filler filling machine for filling containers with liquid is shown in FIGS. 1A, 1B and 1C. The multiple filler filling machine shown includes a reservoir 2 in an upper portion of the filling machine 1, into which a liquid for filling containers with is externally fed through a rotary joint 4, piping 6, and such. The liquid is temporarily stored in the reservoir 2. Around the reservoir 2, a plurality of filling pipes 8 (8-1, 8-2, ..., 8-$n$) are mounted at locations angularly spaced from each other by a predetermined angle. Valves 10 (10-1 through 10-$n$) are mounted at the lower ends of the respective pipes 8-1 through 8-$n$, for controlling the flow rate of the liquid to be supplied through nozzles associated with the respective ones of the valves 10-1 through 10-$n$. A plurality of filling platforms 14 (14-1 through 14-$n$) are disposed beneath the respective ones of the valves 10-1 through 10-$n$, around the lower portion of the filling machine 1. Each of the platforms 14-1 through 14-$n$ is adapted for receiving a container 12 (12-1 through 12-$n$), e.g. a bottle, thereon. The respective platforms 14-1 through 14-$n$ are coupled to respective load cells 16 (16-1 through 16-$n$) used in association with the respective filling platforms 14-1 through 14-$n$. The load cells 16-1 through 16-$n$ are mounted on a load cell table 18 in the lower portion of the filling machine 1. The reservoir 2, the load cell table 18 and the filling platforms 14-1 through 14-$n$ are adapted to rotate at a predetermined rate about a rotation shaft 24 extending vertically through the center of the filling machine 1 when driven by external driving means, e.g. an electrical motor 20, through gears 21 and 22.

Empty bottles are supplied one by one from an external container supplying machine (not shown) to a container entry section of the filling machine 1. The container entry section is on the circle along which the filling platforms 14-1 through 14-$n$ rotate. The empty bottles are put on, one by one, the filling platforms 14-1 through 14-$n$. The bottles 12-1 through 12-$n$ are weighed, while they are moving, and a predetermined amount of liquid is put in each of the bottles 12-1 through 12-$n$. The filled bottles 12-1 through 12-$n$ are conveyed to a discharge section of the filling machine 1, which is at a different location on the circle from the entry section, from where they are discharged from the filling machine 1 to a conveyor in the succeeding stage.

The valves 10-1 through 10-$n$ rotate with the bottles 12-1 through 12-$n$ and are opened when they arrive at a predetermined location on the circle along which the valves 10-1 through 10-$n$ are moving. Then, the liquid is poured into the bottles 12-1 through 12-$n$ at a predetermined flow rate, and, at the same time, the weight of the liquid which has been poured into each bottle 12 is measured by the load cell 16 for that bottle. The apertures of the valves 10-1 through 10-$n$ are so controlled that, when the weight of the liquid poured into each bottle 12 reaches a first value slightly smaller than a target or aimed value, the flow rate can be reduced. The valves 10-1 through 10-$n$ are closed when the weight of the liquid in the respective bottles 12-1 through 12-$n$ reaches a second value which is larger than the first value but is just below the target value. Even after the valves 10 are closed, the liquid portions remaining in the path between the valves 10 and the bottles 12 fall into the bottles 12, and the target amount of the liquid is poured into each bottle 12.

In order to know the weight of the liquid in each bottle 12, an analog weight-representative signal from the associated load cell 16 must be subjected to analog-to-digital conversion to produce a digital weight-representative signal, and the resulting digital weight-representative signal must be subjected to weighing arithmetic operations. For that purpose, a plurality of weighing arithmetic operation means, e.g. arithmetic units 26 (26-1 through 26-$n$), are employed in association with the respective load cells 16-1 through 16-$n$. The number of the arithmetic units 26 is equal to the number of the filling platforms 14 (14-1 through 14-$n$). The arithmetic units 26-1 through 26-$n$ are mounted on an arithmetic unit table 28, which is disposed between the reservoir 2 and the load cells 16-1 through 16-$n$. The arithmetic units 26-1 through 26-$n$ are connected to the associated load cells 16-1 through 16-$n$ with respective signal lines 28.

The arithmetic operations performed in each arithmetic unit are as follows, for example. Description about one arithmetic unit to be given hereinafter is applicable to all and any arithmetic units, and, therefore, in the following description, the suffixes to the reference numerals are not used.

The weight of the object to be measured loaded on the load cell 16, i.e. the weight of the article, e.g. liquid, and the weight of the filling platform 14 and the bottle 12 in case of the filling machine, are measured and developed in the form of an analog weight-representative signal, and the analog weight-representative signal is A/D (analog-to-digital) converted into a digital weight-representative signal Wa.

During adjustment of a weight measuring system employed in the filling machine, the digital weight-representative signal developed when nothing is placed on the platform 14 is stored as an initial value Wi in a memory in the arithmetic unit 26. When the bottle 12 is placed on the filling platform 14 and the filling operation starts, the digital weight-representative signal Wa starts to increase. The sum weight Wn of the bottle 12 and the liquid which has been poured into the bottle 12 on the filling platform 14 is calculated in accordance with an expression:

$$Wn = K(Wa - Wi)$$

where K is such a span factor determined, during the weight measuring system adjustment, by using a reference weight placed on the filling platform 14, that the resultant Wn can be equal to the weight of the reference weight. The span factor K is determined based on the loaded load on the load cell 16, a voltage conversion factor, and an analog weight-representative signal amplification factor employed in the arithmetic unit 26. Thus, the span factor K is dependent on both the load cell 16 and the arithmetic unit 26.

Even when the bottle 12 is not on the filling platform 14, the value Wn is not zero if, for example, a drop of water is on the platform 14. Then, the weight of an object on the platform 14 is expressed by $$Wn = K(Wa - Wi) - Wz$$

where Wz is an amount of change on the zero point. If Wn is not equal to zero (0) when no bottle 12 is on the filling platform 14, that Wn is stored as Wz. This procedure is called zero-point adjustment.

In the filling machine, first, only an empty bottle 12 is carried onto the filling platform 14, and, therefore, the value of Wn in such a case is representative of the weight Wb of the bottle 12 itself. Immediately before the filling of the bottle 12 with a liquid is started, the weight of the bottle 12 is measured and stored in a taring memory. As the filling of the bottle 12 with the liquid starts, Wn becomes representative of the sum of the weights of the bottle 12 and the liquid in the bottle. Then, the operation of Wn−Wb is performed to determine the weight Wm of the liquid only. Alternatively, the zero-point adjustment may be done with the weight of the bottle 12 also taken into account so that Wn can represent the weight of the liquid only. In this case, Wn=Wm.

A plurality of weight levels w1, w2 and wt are set in the arithmetic unit 26 for use in controlling the flow rate of the liquid. The weight level wt corresponds to the target weight. The level w2 is a value close to wt, and the level w1 is lower than w2. In the beginning of the filling, the valve 10 is controlled to supply the liquid through the nozzle at a flow rate of q1. The weight Wm of the liquid in the bottle 12 gradually increases, and is repeatedly compared with the weight level w1 at short intervals to find whether Wm>w1. When Wm becomes larger than w1, the valve 10 is controlled to change the flow rate from q1 to q2, where q2 >q1. The liquid supply is continued at the flow rate of q2, while checking at frequent intervals as to whether Wm>w2. When it is determined that Wm has become larger than w2, the valve 10 is controlled to stop the supply of the liquid. Even after the valve 10 receives a command to close itself, a small amount of the liquid is still supplied to the bottle 12, whereby the bottle 12 is filled with the liquid in the amount substantially equal in weight to the target weight wt.

In weight-based filling machines, in order to determine how much liquid has been ultimately put into the bottle 12, the liquid in the bottle 12 is weighed again a predetermined time after the supply of the liquid to the bottle 12 is stopped, and the measured weight is outputted as a fill weight.

The arithmetic units 26-1 through 26-n rotate with the load cell table 18 and the filling platforms 14-1 through 14-n, and the power for the arithmetic units 26-1 through 26-n are externally supplied through a rotary connector having a rotation axis common to the rotary joint 4. The arithmetic units 26-1 through 26-n are controlled by external, remote displaying and controlling means, e.g. display and control unit 30, to which the arithmetic unit 26-1 through 26-n send data including the weights of the liquid poured into the respective bottles 12. For that purpose, the respective arithmetic units 26-1 through 26-n are connected to the display and control unit 30 via serial communication lines so as to enable bi-directional communications therebetween. As the number of serial communications lines increases, the rotary connector must have an increased number of contacts thereon, which makes the rotary connector expensive. Therefore, corresponding signal lines led out from the respective arithmetic units 26-1 through 26-n are connected in common on a terminal pad and connected to the display and control unit 30 by a minimum of two lines.

The connections between the load cells (LC) 16-1 through 16-n, the arithmetic units 26-1 through 26-n, and the display and control unit 30 are shown in FIG. 1B. In FIG. 1B, each of leads 31-1 through 31-n from the respective load cells 16-1 through 16-n shown includes analog weight-representative signal lines and power supply lines. Terminal pads 32-1 through 32-n are used to connect the associated leads 31-1 through 31-n to the associated arithmetic units 26-1 through 26-n. Lines 33-1 through 33-n connect the terminal pads 32-1 through 32-n to the arithmetic units 26-1 through 26-n. The control signals for controlling the valves 10-1 through 10-n are supplied from the associated arithmetic units 26-1 through 26-n. For that purpose, the valves 10-1 through 10-n are connected to the arithmetic units 26-1 through 26-n by leads 34-1 through 34-n, the terminal pads 32-1 through 32-n, and leads 35-1 through 35-n.

In order to control the filling of the bottles 12-1 through 12-n with the liquid when each of the valves 10-1 through 10-n reaches a predetermined filling start position, the arithmetic units 26-1 through 26-n have to find the position of the respective valves 10-1 through 10-n. For that purpose, a position-representative signal generating unit 36 is provided for the valves 10-1 through 10-n. The position-representative signal is transmitted via the terminal pad 38, where they are connected in common and coupled to the respective arithmetic units 26-1 through 26-n via wiring 40-1 through 40-n.

Corresponding communication lines 42-1 through 42-n led out from the respective arithmetic units 26-1 through 26-n are connected in common on a terminal pad 44, from where they are connected via two signal lines 46 through a rotary connector 48 to the display and control unit 30.

If the filling machine handles liquid to fill containers with, it is cleaned to keep it sanitary. The load cells 16-1 through 16-n, therefore, should be placed within watertight enclosures 50-1 through 50-n, respectively, as shown in FIG. 1C. Support members 52-1 through 52-n extend out of the respective load cells 16-1 through 16-n, and labyrinth seals 54-1 through 54-n are disposed in the openings of the respective enclosures 50-1 through 50-n, through which the support members 52-1 through 52-n extend out.

The above-described type of weight-based, multiple filler filling machine includes a load cell table 18. The table 18 is relatively small in area, and many components, including the load cells 16-1 through 16-n, and the arithmetic units 26-1 through 26-n are to be disposed on it. Therefore, the load cell table 18 must have an area as large as required for these components. In addition, since the loads cells 16-1 through 16-n are separated from the respective arithmetic units 26-1 through 26-n, they must be connected by the relatively long wiring 31-1 through 31-n and the wiring 33-1 through 33-n via the terminal pads 32-1 through 32-n, respectively, and the size of the wiring must be adjusted in accordance with the size of the filling machine, which has impeded reduction of wiring costs.

If it is found that the amount of the liquid supplied to each bottle is not appropriate, an operator may desire to adjust the machine as soon as possible. In such a case, it is difficult to determine which are out of order, the load cells 16 or the arithmetic units 26, and, therefore, both need to be replaced by new ones. In addition, when replacement of components is made, the span factor K must be determined anew by placing the reference weight on the filling platforms so that the weight equal to the reference weight can be displayed on the display and control unit 30.

If manufacturers of weight-based, multiple filler filling machine desire to have arithmetic operations of the weight-based filling machine performed by general information processing machines or hardware and software for general information processing machines, they usually do not have know-how to have required weighing arithmetic operations performed by such machines. Consequently, they must buy dedicated filling machine arithmetic units from weighing machine manufacturers, and manage to place them together with the load cells 16-1 through 16-*n* on the load cell table 18 which has little room.

Both hardware and software of prior art arithmetic units 26 are designed in accordance with design concepts of manufacturers of weighing machines. Users of filling machines, therefore, are restricted in various ways when they try to build up, based on their own concepts of filling machine users, operating procedures and data display procedures on the display screen of the display and control unit, for example, which must be easily operable.

Although waterproof load cells have been used in weight-based filling machines, there have been no waterproof arithmetic units. Therefore, troubles have to be taken to provide watertight covers and labyrinth seals for the arithmetic units.

Therefore, an object of the present invention is to provide a weight-based, multiple filler filling machine free of the above-discussed problems.

SUMMARY OF THE INVENTION

One solution to the above-described problems may be to integrate or combine load cells and weighing arithmetic operation means into a single, integrated weight measuring system so that they can be manufactured, installed and managed integrally.

For example, weighing arithmetic operation means may be mounted on the surface of or inside a load cell. As an alternative example, a load cell and weighing arithmetic operation means may be put in a watertight enclosure together.

In these days, it is able to downsize electronic components significantly, and, therefore, it has become possible to design small-sized electronic circuits which can perform highly complicated functions, regardless of whether they are analog or digital. On the other hand, load cells used in a weight-based, multiple filler filling machine have a load sensing element, which, when a load is applied to it, is deformed to a degree in accordance with the magnitude of the load. The load sensing element has a strength sufficient to bear weight of several kilograms, and, accordingly, the load cells have a volume sufficient to accommodate the filling-machine weighing arithmetic operation means.

The use of integrated units including such integrated or combined load cell and weighing arithmetic operation means increases the efficiency of manufacturing weight-based, multiple filler filling machines.

A weight-based, multiple filler filling machine includes a large number of load cells and arithmetic operation means, failure tends to occur very frequently. By keeping a reserves of such integrated load cell and weighing arithmetic operation means units, it is readily possible to replace a failing load cell and/or arithmetic operation means with good ones. The maintenance efficiency can be further increased by keeping integrated load cell and weighing arithmetic operation means units as reserves for future use, with the span factor K adjusted beforehand using a reference weight, which eliminates the need for the span adjustment during replacement.

In Japanese Patent No. 2,709,837 issued on Oct. 24, 1997, which corresponds to U.S. Pat. No. 4,815,547 issued to Benny N. Dillon et al. on Mar. 28, 1989, an weighing apparatus including an arithmetic operation circuit board integrally mounted on a load sensing element, or counterforce, of a load cell is disclosed. In the weighing apparatus disclosed in this patent, a plurality of load cells support one table on which an article to be measured is placed, and a circuit board with hardware including an A/D converter, a CPU and serial communications circuitry, is mounted on a side surface of each load cell. Digital weight-representative signals output by the respective circuit boards are collected in a main controller, from which a single measurement signal is developed as an output of the weighing apparatus. The load cells of this weighing apparatus interfere with each other via the table. It may be possible to arrange that the individual weight-representative signals from the respective load cells can be read on the main controller. However, if the single measurement signal of the weighing apparatus is abnormal due to mechanical troubles, evaluation of the individual weight-representative signals from the respective load cells cannot identify which one of the load cells is out of order.

According to the present invention, each integrated unit of a load cell and arithmetic operation means used in a weight-based, multiple filler filling machine weighs an article in an individual one of containers and, therefore, is not interfered by other load cells or articles in other containers. Accordingly, it is easy to find which one of the load cells is out of order.

The load cells with the arithmetic operation means disposed on the surface of or inside the load cells may be hermetically sealed, or each load cell may be disposed together with an associated arithmetic unit within a hermetically sealed enclosure. Such hermetically sealed units can be used for a weight-based, multiple filler filling machine for filling containers with a liquid, without need for using special watertight arrangements, such as a labyrinth.

An arithmetic operation means manufacturer may design the arithmetic operation means for the filling machine to be operated through external hardware, such as an external key switch having a fixed characteristic, or to output data to be displayed in a specific form on a specific display. In such a case, even if the arithmetic operation means is designed to be able to communicate with external apparatuses, it is not possible for a filling machine manufacturer to produce a filling machine based on an optimum design concept.

In order to solve this problem, in the weighing arithmetic operation means according to the invention, instruction codes may be assigned to specific weighing arithmetic operations, such as the zero-point adjustment, the span adjustment and the tare weight storage. A selected instruction code is provided by the display and control means so that the arithmetic operations corresponding to the selected instruction code can be performed. In this case, data to be displayed generated in the weighing arithmetic operation means, such as, for example, the weight of an article which has been placed in a container, and the weight of the steady-state article in the container measured after the filling has been completed, are previously assigned with respective identification codes and outputted together with the assigned codes so that they can be handled or processed as desired in the display and control means. The respective codes and their meanings are open to users including filling machine manufacturers. Accordingly, filling machine manufacturers can control the weighing arithmetic operation means through display and control means they have manufactured, using desired sequences and desired operating means, e.g. desired key switches. Also, it is possible for the filling machine manufacturers to cause data outputted by the arithmetic operation means to be displayed in any desired form at any desired position on the display and control means. This means that the filling machine manufacturers can produce weight-based, multiple filler filling machines based on their own design conceptions.

For example, communications between a plurality, N, of weighing arithmetic operation means and single display and control means may be done through a 1:N serial communication line. For example, the display and control means is set to be a master device with the N arithmetic operation means set to be slave devices. The display and control means and the respective arithmetic operation means are connected directly to the same communication line bus, and the display and control means, which is the master device, sequentially polls the arithmetic operation means which are the slave devices. Thus, there is no need to use a unit, e.g. an intermediate terminal pad, on which display data from the respective arithmetic operation means are collected for reducing the number of connecting lines.

As for wiring for the weighing arithmetic operation means, lines for signals outputted by the arithmetic operation means are conventionally connected to terminals on a terminal pad for reducing the number of lines for sending signals therethrough to the display and control means, by connecting similar signal lines together. However, such arrangement requires the use of the terminal pad, the connections of the respective arithmetic operation means to the terminal pad, the wiring between terminals on the terminal pad for common connections of the related signal lines, and so forth. This also increases the wiring to the terminal pad.

In a weight-based, multiple filler filling machine, load cells are arranged with a small distance between adjacent ones. An example of advantageous wiring for the weighing arithmetic operation means for a weight-based, multiple filler filling machines is as follows: (This arrangement is more advantageous than the above-described one in which wires from a number of arithmetic operation means are collected together on a single terminal pad.) Each weighing arithmetic operation means includes a printed circuit board on which one signal is outputted at two output connectors. Similar output connectors of arithmetic operation means disposed adjacent to each other are connected together by means of a short wiring unit. Using similar short wiring units, a number of adjacent arithmetic operation means are connected in series. In this case, the number of the short wiring units is equal to the number of the serially connected arithmetic operation means minus one. With this wiring arrangement, the amount of lines and the wiring operation can be reduced.

The polling requires a relatively long time in communication, and, therefore, it is difficult to employ the polling technique for controlling the article supplying rate in a high-speed, high-performance filling scale. Accordingly, each of the weighing arithmetic operation means itself may be arranged to have a function to perform weighing arithmetic operations, while the display and control means is arranged not to be involved with the weighing arithmetic operations which should be performed in real time. With this arrangement, the sending of a signal to command the filling means, e.g. a valve, to reduce the article supply rate or to stop the supply of the article, upon detection of the article reaching the set levels in the container, which must be done at a high speed, can be made independent of the communication rate of the communication means.

Data transferred between the display and control means and the respective weighing arithmetic operation means include, but not limited to, parameters required by the arithmetic operation means to perform the necessary weighing arithmetic operations, data for controlling the supply flow rate, commands for zero-point adjustment, span adjustment etc. and data to be displayed after the completion of the filling operation generated in the respective weighing arithmetic operation means, all of which do not require high-speed, real-time processing.

A weight-based, multiple filler filling machine includes a plurality of load cells. It may be operated to fill a number of containers simultaneously. In such a case, simultaneous, parallel processing of weight-representative signals from a plurality of load cells is required. In addition, different from static weighing, there are restrictions on weight-representative signal sampling and processing times. Furthermore, in order to fill containers precisely with an aimed amount of the article, the filling means must be controlled, too.

According to the present invention, load cells signals from which must be processed in real time may be arranged as subordinate arithmetic operation means to provide digital weight-representative signals. Then, superordinate arithmetic operation means is provided for collectively processing input and output signals from and to the respective subordinate arithmetic operation means. The superordinate and subordinate arithmetic operation means may be connected by serial communication lines. The superordinate arithmetic operation means need to control the article supply rate on the basis of the weight of the article in the respective containers provided thereto from the associated load cells. Accordingly, the filling means may be controlled in real time, too.

As described above, by assigning to load cells, a function to measure weights of an article in a number of containers in a parallel, real-time and high-speed fashion, while using superordinate arithmetic operation means smaller in number than the load cells for controlling the filling operation, the number of weighing arithmetic operation means required for the system can be reduced, which, in turn, results in downsizing of the filling machine.

BRIEF DESCRIPTION OF THE DRAWINGS

FIGS. 1A, 1B and 1C show a prior art weight-based, multiple filler filling machine, in which FIG. 1A is its side view, FIG. 1B is a block circuit diagram of the prior art filling machine, and FIG. 1C is an enlarged view of a load cell used in the filling machine of FIG. 1A;

DETAILED DESCRIPTION OF THE INVENTION

A weight-based, multiple filler filling machine 1a according to a first embodiment of the present invention is shown in FIGS. 2, 3, 4A, 4B and 5.

Figure 1A:
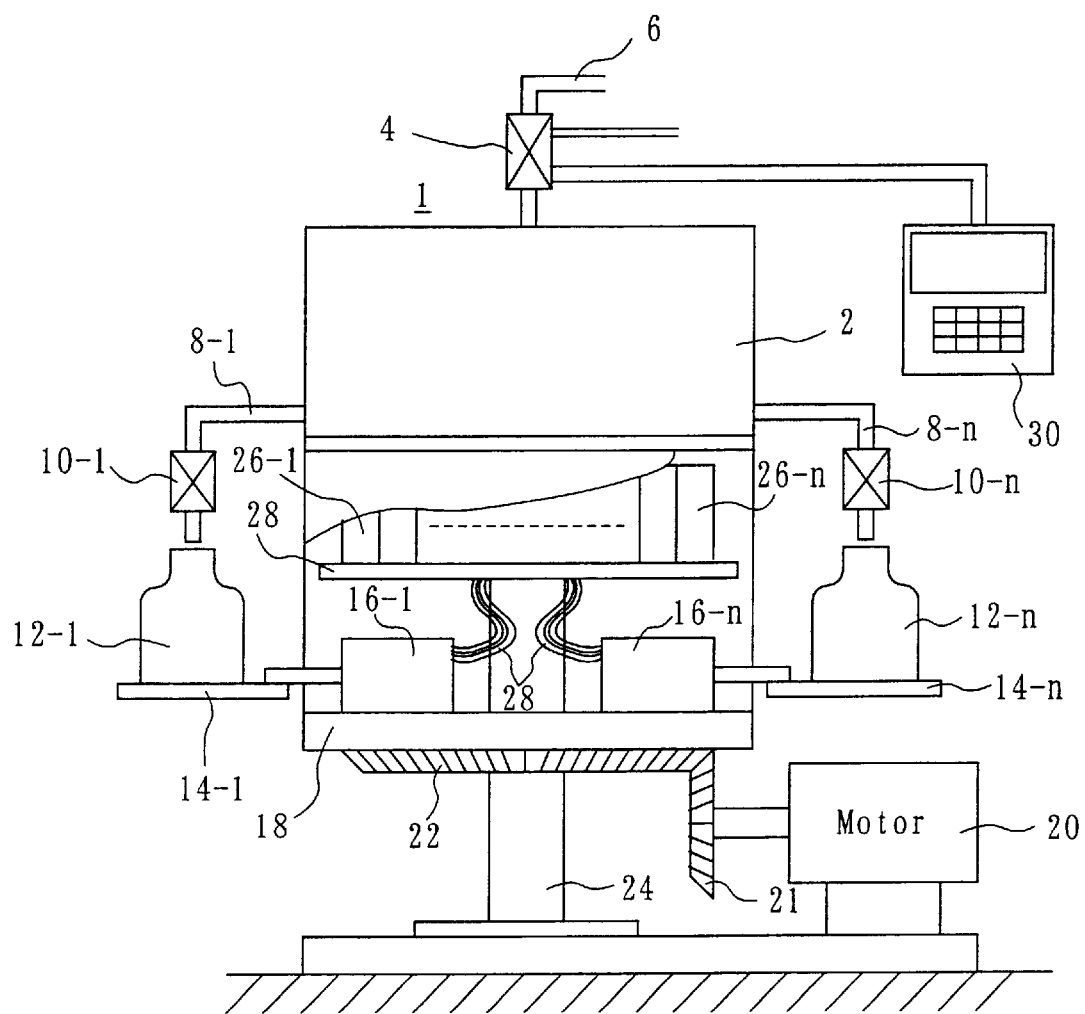
Figure 1B:
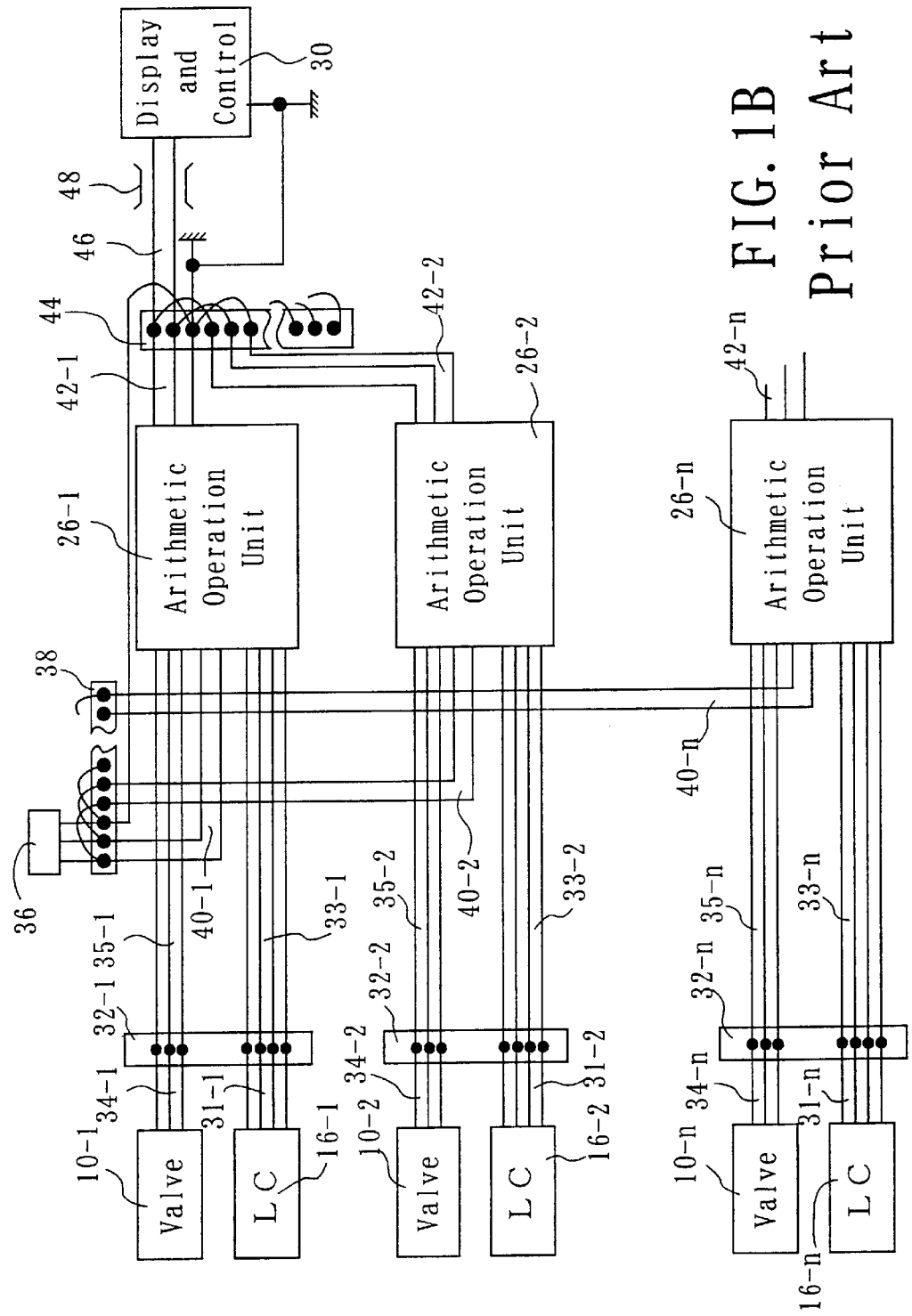
Figure 1C:
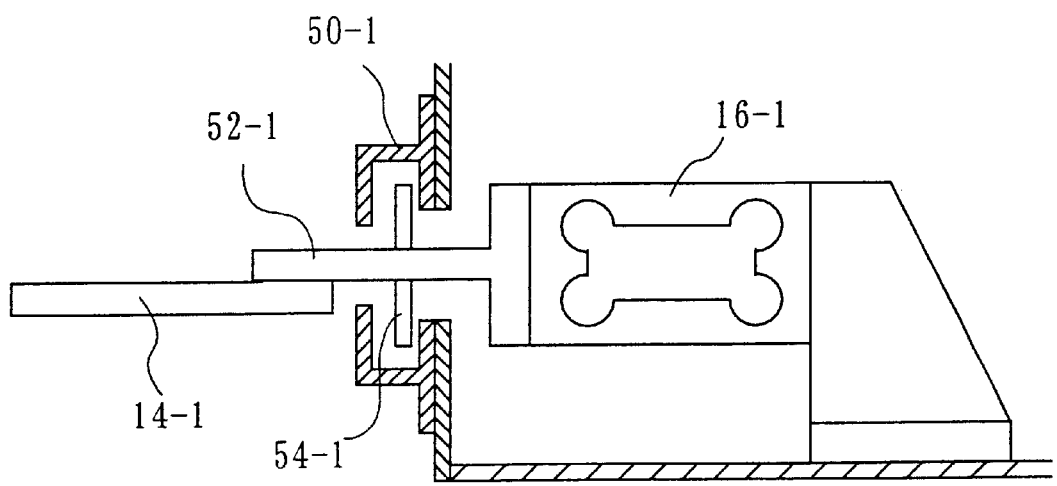
Figure 2:
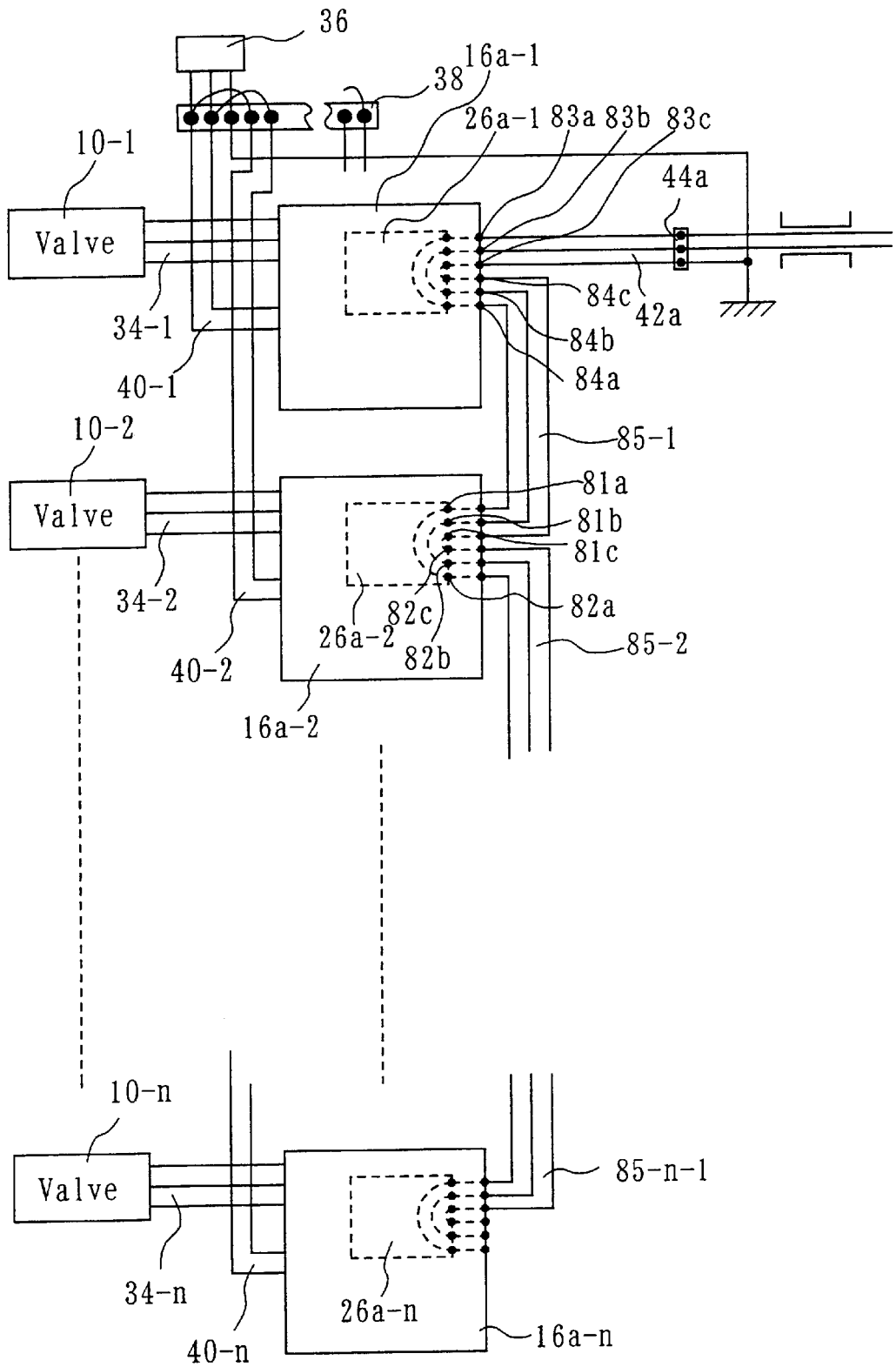
FIG. 2 is a block circuit diagram of a weight-based, multiple filler filling machine according to a first embodiment of the present invention.
Figure 3:
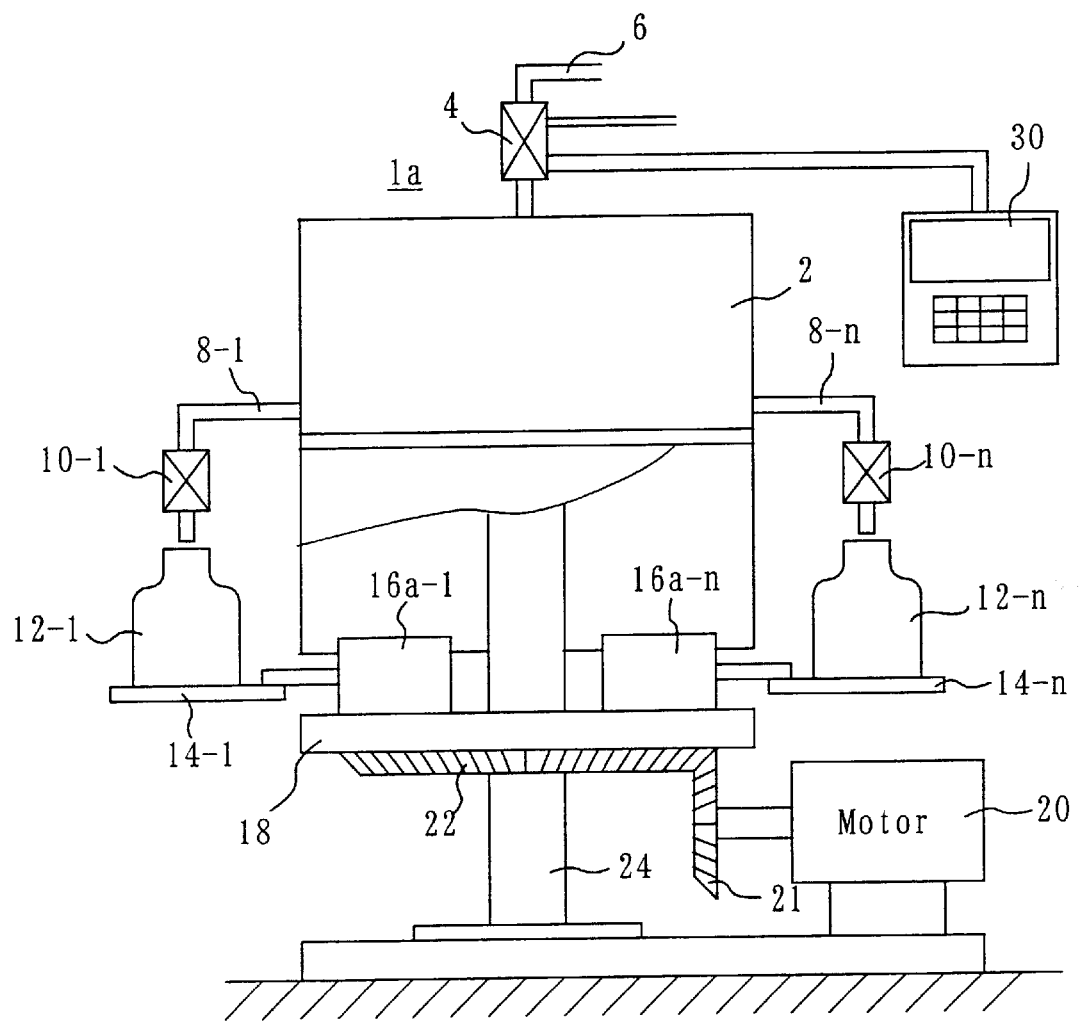
FIG. 3 is a schematic side elevational view of the filling machine of FIG. 2, with its part removed.

As is understood from comparing FIG. 1A with FIG. 3, the filling machine 1a includes, in place of the weighing arithmetic units 26-1 through 26-n and the discrete load cells 16-1 through 16-n, arithmetic unit and load cell modules 16a-1 through 16a-n each including a load cell and a weighing function arithmetic unit. Hereinafter, the arithmetic unit and load cell module is referred to as "load cell module". In FIGS. 2 through 8, those components which are same as or similar to the ones shown in FIGS. 1A, 1B and 1C are shown with the same reference numerals as used in FIGS. 1A, 1B and 1C, and no further description thereof is given.

Figure 4A:
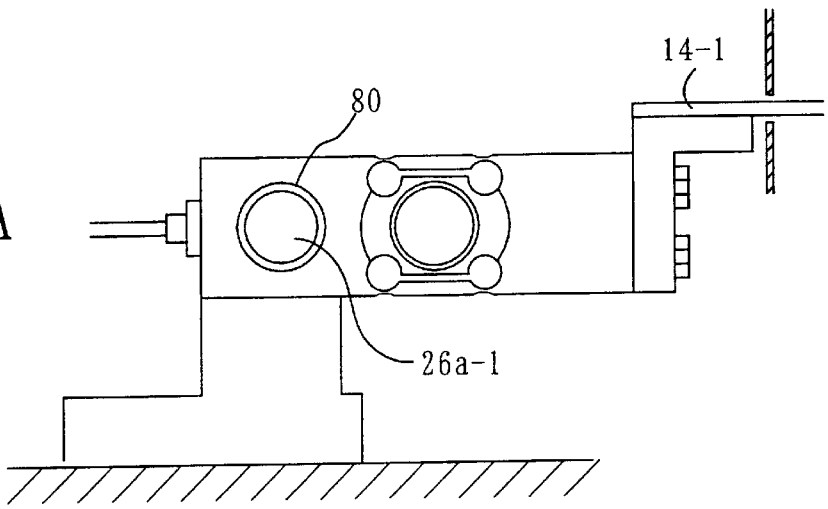
FIG. 4A shows a load cell used in the filling machine shown in FIGS. 2 and 3.
Figure 4B:
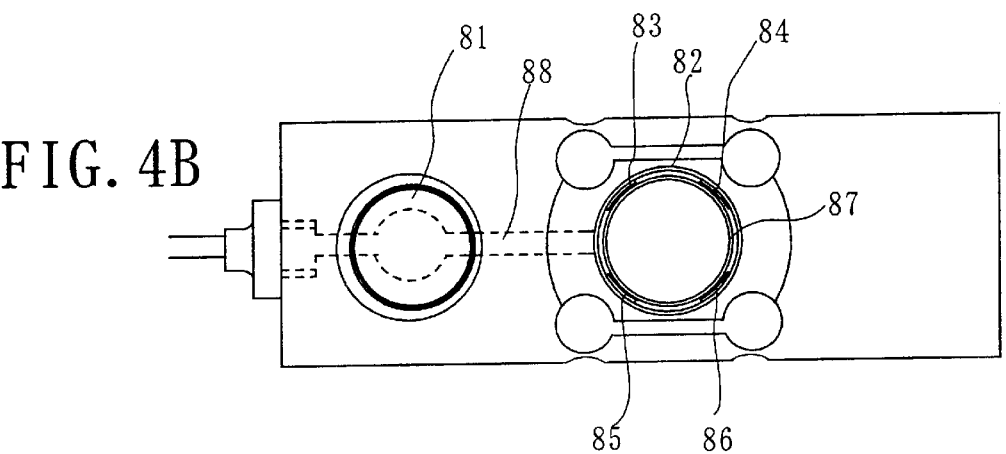
FIG. 4B is an enlarged view of the load cell of FIG. 4A.

Each of the load cell modules 16a-1 through 16a-n includes a load cell having a load sensing element with a cavity 81 (FIG. 4A) formed in a portion thereof at which the load sensing element is fixed to a base, and an associated one of arithmetic units 26a-1 through 26a-n is placed in the cavity 81 (FIG. 4A). The load sensing element has a cylindrical bore 82 (FIG. 4B) for detecting weight. The cylindrical bore 82 is deformed into an elliptic shape when a load is applied to the load sensing element. Strain gages 83, 84, 85 and 86 are attached on the inner surface of the cylindrical bore 82 for measuring the amount of strain. A cylindrical member 87 is inserted into the cylindrical bore 82 to cover the inner surface of the bore 82 and the inner surfaces of the strain gages 83, 84, 85 and 86. The cylindrical member 87 has a lid member attached to its one end, which is placed on and welded to a peripheral step formed in the corresponding end of the cylindrical bore 82, to thereby hermetically seal the strain gages 83, 84, 85 and 86 from the open air. Wiring between the strain gages 83, 84, 85 and 86 and the arithmetic units 26a-1, . . . , and 26a-n is done through a communication bore 88 formed in the load sensing element. The function of the arithmetic units 26a-1 through 26a-n is the same as that of the prior art arithmetic units 26-1 through 26-n. The open ends of the respective cavities are closed by welding a metal lid 80 to seal the cavities watertight and airtight. Thus, no special waterproofing measures need be provided separately for the arithmetic units 26a-1 through 26a-n and the strain gages 83, 84, 85 and 86. No labyrinth is required. Furthermore, no wiring need be provided between the respective ones of the load cells 16a-1 through 16a-n to the corresponding ones of the arithmetic units 26a-1 through 26a-n.

Figure 5:
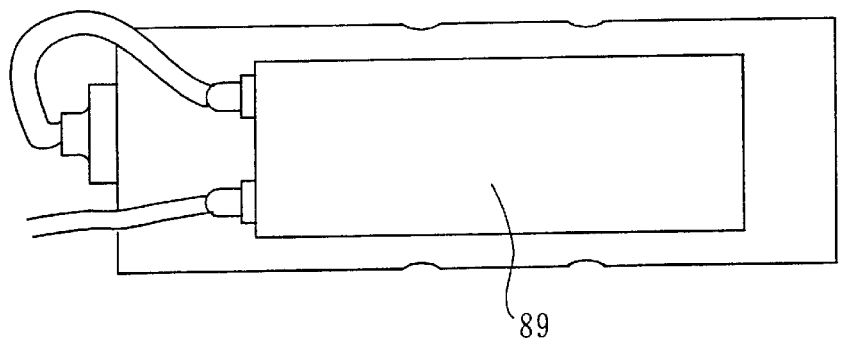
FIG. 5 is a plan view of another example of a load cell useable in the filling machines of the present invention.

FIG. 5 shows another example of a load cell, in which the arithmetic units are not disposed within the respective load sensing elements, but they are placed in separate hermetic enclosures 89 mounted to the outer surfaces of the respective load sensing elements.

FIG. 2 shows how the components of the filling machine 1a are connected. The load cell modules 16a-1 through 16a-n perform the same functions as the load cells 16-a through 16-n and the arithmetic units 26-1 through 26-n of the prior art filling machine. Accordingly, there is no wiring corresponding to the wiring 33-1 through 33-n shown in FIG. 1B.

Each of the arithmetic units 26a-1 through 26a-n in the load cell modules 16a-1 through 16a-n are provided with common signal input/output terminals 81a, 81b, 81c, 82a, 82b and 82c. (In FIG. 2, the reference numerals 81a, 81b, 81c, 82a, 82b and 82c are shown only for the arithmetic unit 26a-2.) Signals are outputted from these terminals 81a, 81b, 81c, 82a, 82b and 82c to output connectors 83a, 83b, 83c, 84a, 84b and 84c, respectively. (In FIG. 2, the reference numerals 83a, 83b, 83c, 84a, 84b and 84c are shown only for the module 16a-1.)

In a rotary or line-type, weight-based, multiple filler filling machine, the load cell modules 16a-1 through 16a-n are equiangularly disposed. Prior to the assembling of the filling machine 1a, the output connectors 83a, 83b, 83c, 84a, 84b and 84c of one load cell module are connected to those of adjacent load cell modules by means of wiring units 85-1 through 85-n having the same wire length. This can reduce the time for wiring the filling machine 1a.

Instructions, such as zero-point adjustment, tare weight storage and span factor adjustment, from the external display and control unit 30 to the respective arithmetic units 26a-1 through 26a-n of the respective load cell modules 16a-1 through 16a-n are provided in the form of predetermined code signals open to users. Accordingly, a filling machine designer can determine, at his or her discretion, operation procedures and assignment of functions to respective key switches in the display and control unit 30. For example, a desired instruction code may be generated by means of a software switch displayed on a screen, to thereby cause the arithmetic units 26a-1 through 26a-n of the load cell modules 16a-1 through 16a-n to perform the desired instructions.

The arithmetic units 26a-1 through 26a-n output various data with predetermined identification codes open to the users assigned thereto. The data include steady-state weights of the article or liquid in the respective containers or bottles measured after the completion of the filling operation, and span factors determined in the span adjustment. Therefore, the display and control unit 30 can judge what are meant by the identification codes attached to the data to thereby display the data in appropriate character styles and shapes at appropriate positions on appropriate pictures, graphically if necessary.

The load cell modules 16a-1 through 16a-n include the arithmetic units 26a-1 through 26a-n, respectively. The display and control unit 30 is designed such that the values w1, w2 and wt, previously described with reference to the prior art, which are used to control the flow rate of the liquid and to stop the supply of the liquid, can be set together with predetermined codes assigned to them in the display and control unit 30. Then, these values are automatically supplied to memories of the respective arithmetic units 26a-1 through 26a-n and are set therein.

Each of the arithmetic units 26a-1 through 26a-n samples an analog weight-representative signal from the associated one of the load cells 16a-1 through 16a-n at short time intervals, computes the weight of the liquid in the associated one of the bottles 12-1 through 12-n by performing predetermined arithmetic operations, judges when the weight of the liquid in the bottle reaches a predetermined level, and controls the valve as soon as the weight of the liquid reaches the predetermined level to thereby adjust the flow rate. Performing arithmetic operations for the liquid weight in each bottle at short time intervals makes it possible to provide a desired control signal to the associated valve without delay. Therefore, the load cell modules 16a-1 through 16a-n with the arithmetic units 26a-1 through 26a-n built therein, respectively, do not adversely affect the filling precision.

The respective arithmetic units 26a-1 through 26a-n associated with the load cell modules 16a-1 through 16a-n control the flow rates of the liquid supplied to the respective bottles 12-1 through 12-n, and the load cell modules 16a-1 through 16a-n output control signals directly to the associated valves 10-1 through 10-n associated with the filling platforms 14-1 through 14-n. Therefore, the leads 34-1 through 34-n for transmitting the control signals therethrough can be connected directly to the respective valves 10-1 through 10-n, whereby the space and time for the connections can be minimized.

Figure 6:
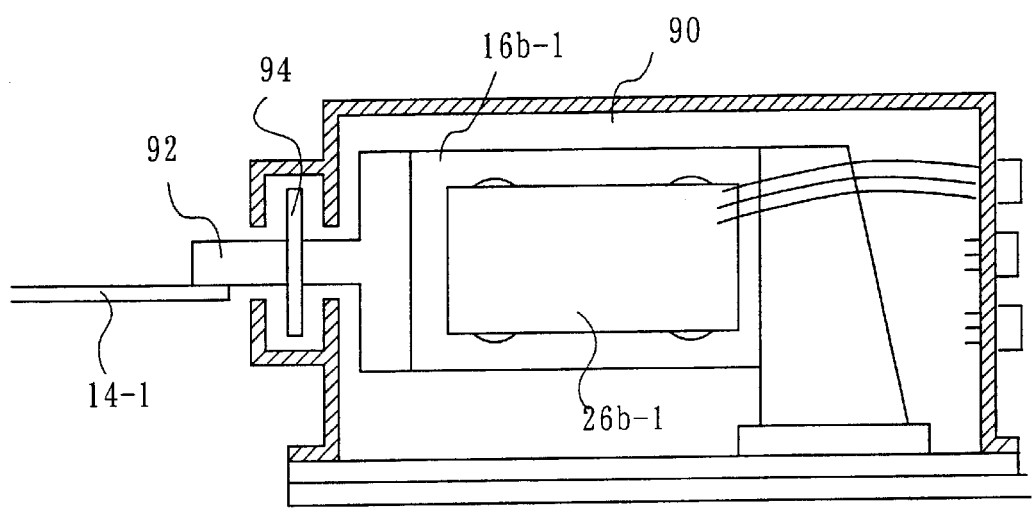
FIG. 6 is an enlarged side view of a load cell useable in a weight-based, multiple filler filling machine according to a second embodiment of the present invention.

FIG. 6 shows part of a weight-based, multiple filler filling machine according to a second embodiment of the present invention. The structure of the filling machine according to the second embodiment is substantially the same as the filling machine according to the first embodiment, and, therefore, only portions different from the first embodiment are described.

Load cell modules 16b-1 through 16b-n are provided with arithmetic units 26b-1 through 26b-n integrally mounted on the surfaces of load sensing elements of the respective load cells. In FIG. 6, only one load cell module, namely, the load cell module 16b-1 and its associated parts are shown. The remaining load cell modules 16b-2 through 16b-n are similarly arranged to the load cell module 16b-1. The load cell modules 16b-1 through 16b-n are individually placed in associated ones of watertight enclosures 90. The load cell module 16b-1 has a member 92 with which it is secured to the filling platform 14-1. A waterproofing member 94, e.g. a labyrinth member, is mounted on the member 92.

Although this structure requires a waterproofing arrangement, the arithmetic units 26b-1 through 26b-n, which are mounted on the surfaces of the respective load sensing elements of the load cells, are also waterproofed, and wiring can be simplified. Accordingly, the manufacturing cost can be reduced.

It should be noted that, in the first embodiment, too, the arithmetic units 26a-1 through 26a-n can be mounted on the surfaces of the load sensing elements of the associated load cells, and the load cell modules can be sealed to make them watertight.

Figure 7:
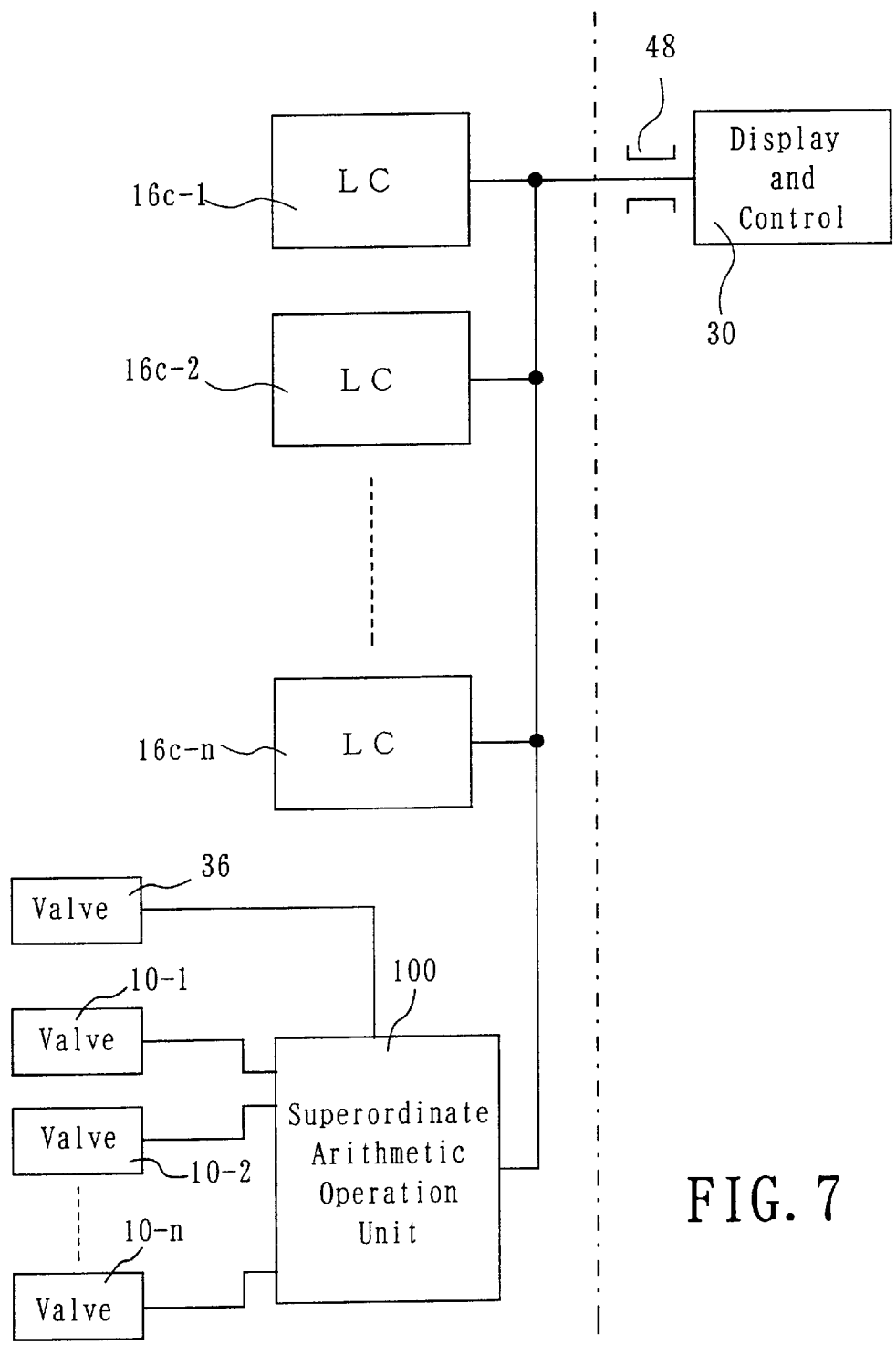
FIG. 7 is a block circuit diagram of a weight-based, multiple filler filling machine according to a third embodiment of the present invention.

FIG. 7 shows a filling machine according to a third embodiment of the present invention. The filling machine includes load cell modules 16c-1 through 16c-n, each of which includes a load cell and an arithmetic operation circuit integrally mounted on or in the load cell. Each of the arithmetic operation circuit includes an A/D converter for A/D converting an analog weight-representative signal outputted by the associated load cell into a digital weight-representative signal, and a communication circuit for serially transmitting the digital weight-representative signal to an external apparatus.

Each of the load cell module 16c-1 through 16c-n includes an arrangement for processing the analog weight-representative signal before it is converted into the digital weight-representative signal. A reserve of load cell modules of this type, which are span adjusted beforehand by the use of a reference weight having the reference weight, may be kept so that a new one can be substituted immediately, without need for any adjustment, for a malfunctioning load cell module found during operation of the filling machine. The load cell modules according to the first and second embodiments may be arranged similar to the ones of the third embodiment.

Another, discrete superordinate arithmetic operating unit 100 is used. The superordinate arithmetic unit 100 receives the digital weight-representative signals from the load cell modules 16c-1 through 16c-n, and performs various arithmetic operations. The arithmetic operations performed by the unit 100 include the initial tare-offsetting arithmetic operations for compensating for weight measurement variations essentially due to variations in the mounting, geometry and the like of the respective load cells, the weight measurements due to the respective filling platforms, and the measurements due to the offsets in the amplifiers, the zero-point adjustment operations, the article weight computation operations in which the weights of the containers are subtracted, and the weight level determining arithmetic operations. Alternatively, the arithmetic operations, except, for example, the weight level determining arithmetic operations, may be performed in the arithmetic operation circuits associated with the respective load cell modules 16c-1 through 16c-n.

The single superordinate arithmetic unit 100 receives the digital weight-representative signals from all of the load cell modules 16c-1 through 16c-n, or all of the article weight measurements, performs the weight level determining arithmetic operations for determining the weight levels in all of the containers or bottles on the filling platforms, and controls all of the valves 10-1 through 10-n in accordance with the results of the arithmetic operations. The superordinate arithmetic unit 100 determines the position of each of the valves 10-1 through 10-n from the position-representative signal from the position-representative signal generating unit 36. The arithmetic unit 100 causes each of the valves 10-1 though 10-n to be opened when it arrives at the position where the filling operation should be started, and, thereafter, controls the degrees of the openings of the respective valves 10-1 through 10-n in accordance with the weight levels of the article filling the associated containers.

The display and control unit 30 is used, separate from the arithmetic unit 100, for effecting various settings and operations including displaying the various values of measurements, for setting the weight levels, setting the zero-point, and operating the various parts of the filling machine. The display and control unit 30 may be directly connected only to the arithmetic unit 100 by a communication line, or may be connected, as shown in FIG. 7, to all of the load cell modules 16c-1 through 16c-n as well as the arithmetic unit 100 by a common, single, serial communication line.

Figure 8:
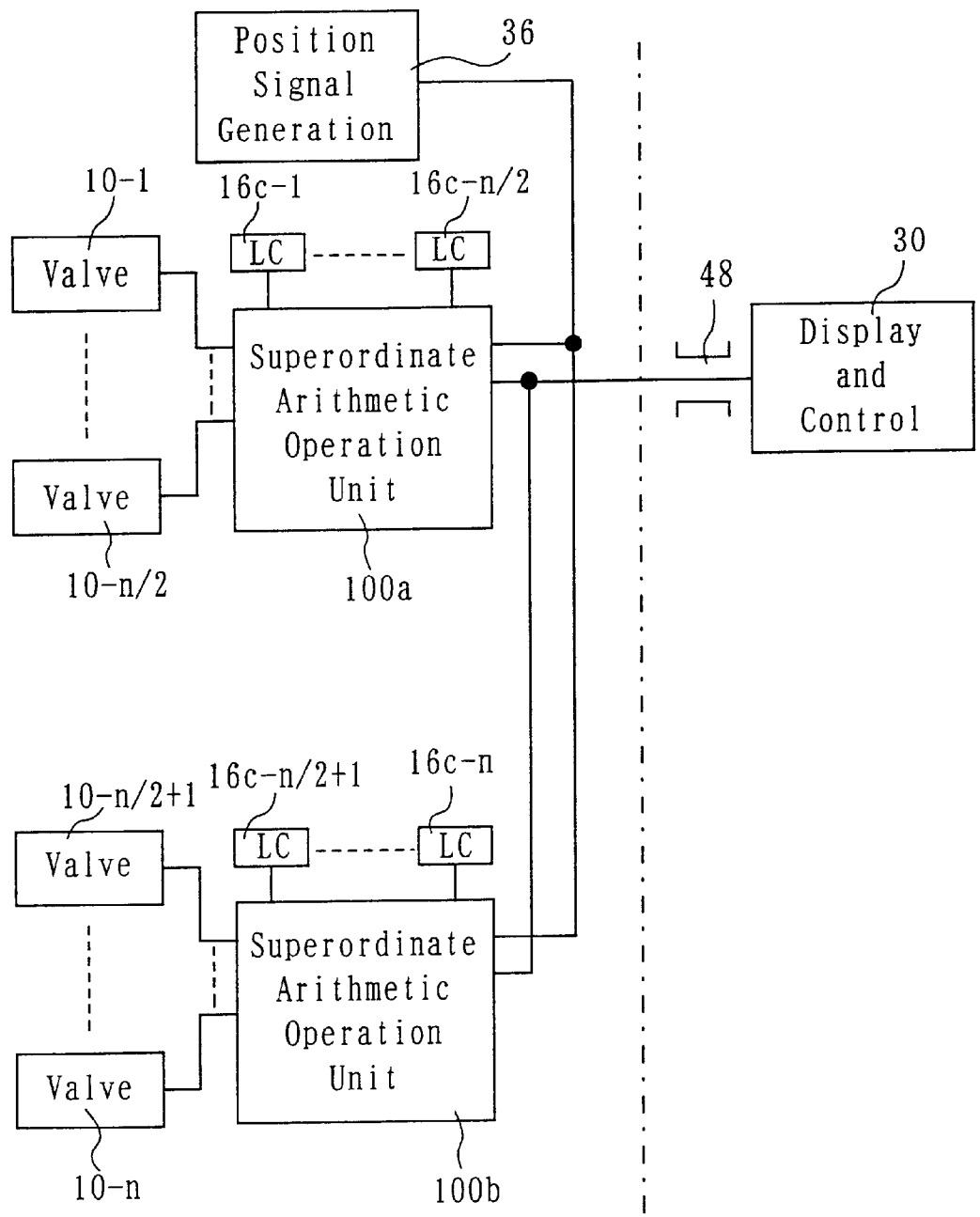
FIG. 8 is a block circuit diagram of a weight-based, multiple filler filling machine according to a fourth embodiment of the present invention.

FIG. 8 shows a filling machine according to a fourth embodiment of the invention. Generally, it is desirable to use as few superordinate arithmetic units as possible. If, however, the number of the load cell modules is too large for a single superordinate arithmetic unit to perform adequate arithmetic operations and control. In such a case, a plurality, e.g. two of such superordinate arithmetic units 100a and 100b are used in the filling machine shown in FIG. 8, to thereby share the processing of the signals from the load cell modules 16c-1 through 16c-n between them. As for the wiring for communications, one serial communication line may be used for each load cell module and the superordinate arithmetic unit associated with that load cell module, with a single serial communication line used for communications between the display and control unit 30 and the two superordinate arithmetic units 100a and 100b, as shown in FIG. 8. Alternatively, a single serial communication line may be used for all of the load cell modules 16c-1 through 16c-n and the superordinate arithmetic units 100a and 100b.

The present invention has been described by means of a weight-based, multiple filler filling machine for filling containers with liquid, but it can be used for filling containers with powdery materials and particulate materials.

The filling machine described above is a rotary type machine with load modules and containers rotate, but with the present invention can be applied to linear type filling machines with containers linearly moving while being filled with an article.

Figure 9:
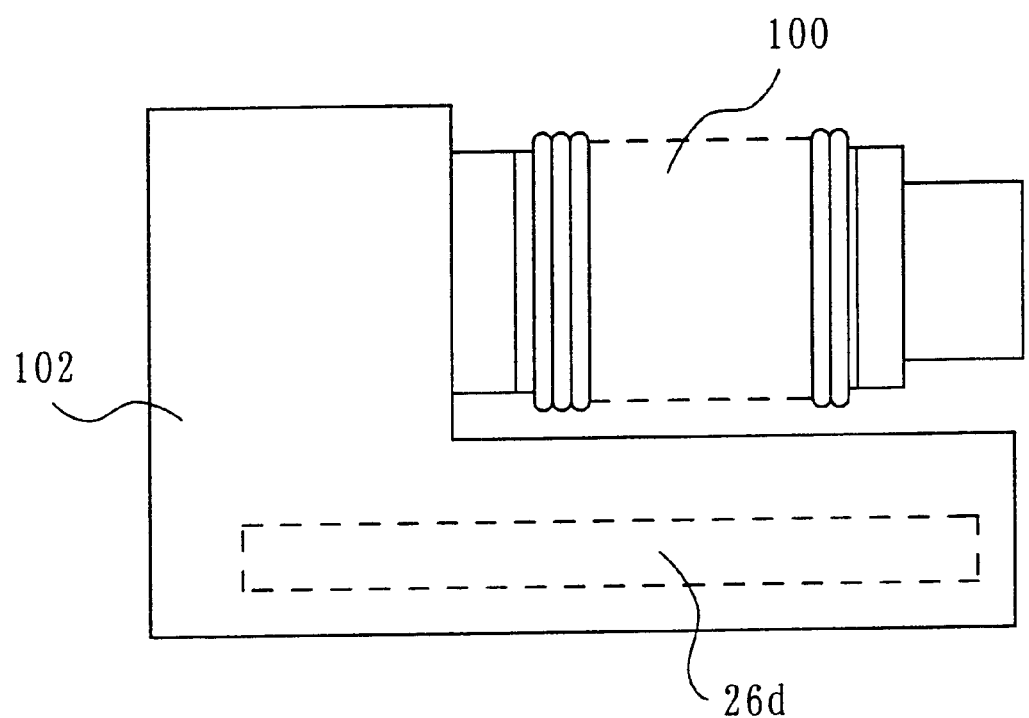
FIG. 9 shows another example of load cell module useable in the present invention.

The load cell module useable in the filling machines according to the first and second embodiments includes an arithmetic unit mounted on the surface of or inside the load sensing element. As shown in FIG. 9, each arithmetic unit 26d may be disposed inside a support 102 supporting a load cell 100. Since the arithmetic unit 26d is not directly mounted on the load cell 100, the arithmetic operating unit 26d does not interfere with the bending of the load cell 100 when load is applied to it. The arithmetic unit 26d can be waterproofed.

Alternatively, the arithmetic unit 26d may be mounted on the outer surface of the support 102. In this case, as in the second embodiment shown in FIG. 6, the support 102 as well as the load cell 100 are desirably placed within a watertight enclosure.

In a still other alternative, the arithmetic unit 26d may be placed inside a sealing enclosure, similar to the example shown in FIG. 5. The sealing enclosure with the arithmetic unit 26d therein is then mounted on the support 102.

Also, like the third and fourth embodiments, an A/D converter and an arithmetic operation circuit with a communication circuit may be placed inside or on the outer surface of the support 102.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A weight-based, multiple filler filling machine for filling a plurality of containers with a predetermined quantity of article by means of a plurality of filling means, comprising:
   a plurality of load cells each measuring an amount of said article in an associated one of said containers;
   a plurality of weighing arithmetic operation means each including at least weight level determining means for determining a weight level of said article in the associated container as measure by the associated load cell; and
   a plurality of generally L-shaped supports, each comprising a first member and a second member extending perpendicularly to said first member;
   each of said load cells being so mounted on said first member of an associated one of said supports as to be generally in parallel with said second member, with said weighing arithmetic operation means mounted inside said second member.

2. The weight-based, multiple filler filling machine according to claim 1 wherein each of said weighing arithmetic operation means is sealed inside said second member of an associated one of said supports.

3. The weight-based, multiple filler filling machine according to claim 2, further comprising:
   one display and control means for transmitting control data to said respective load cells and to respective weighing arithmetic operation means for controlling said respective weighing arithmetic operation means, and displaying operating states of said respective load cells and respective weighing arithmetic operation means in accordance with display data received from said respective weighing arithmetic operation means;
   said control data including codes opened to public;
   said display data being data with said codes attached thereto.

4. The weight-based, multiple filler filling machine according to claim 2, further comprising:
   one display and control means for controlling said respective load cells and respective weighing arithmetic operation, and displaying operating states of said respective load cells and respective weighing arithmetic operation means;
   said respective weighing arithmetic operation means and said display and control means being interconnected by a set of wiring units.

5. The weight-based, multiple filler filling machine according to claim 1, further comprising:
   one display and control means for transmitting control data to said respective load cells and to respective weighing arithmetic operation means for controlling said respective weighing arithmetic operation means, and displaying operating states of said respective load cells and respective weighing arithmetic operation means in accordance with display data received from said respective weighing arithmetic operation means;
   said control data including codes opened to public;
   said display data being data with said codes attached thereto.

6. The weight-based, multiple filler filling machine according to claim 1, further comprising:
   one display and control means for controlling said respective load cells and respective weighing arithmetic operation, and displaying operating states of said respective load cells and respective weighing arithmetic operation means;
   said respective weighing arithmetic operation means and said display and control means being interconnected by a set of wiring units.

7. A load cell module comprising:
   a generally L-shaped support including a first member and a second member extending perpendicularly to said first member;
   a load cell including weight detecting means, said load cell being mounted on said first member in such a manner as to extend generally in parallel with said second member; and
   weight level determining means mounted inside said second member, for determining a weight level of an article as detected by said weight detecting means.

8. A weight-based, multiple filler filling machine for filling a plurality of containers with a predetermined quantity of article by means of a plurality of filling means, comprising:
   a plurality of load cell modules each including a load cell, digital weight-representative signal generating means for generating at least a digital weight-representative signal corresponding to a weight of said article as applied to said load cell, and a generally L-shaped support including a first member and a second member extending generally perpendicularly to said first member, said load cell being mounted on said first member in such a manner as to extend generally in parallel with said second member, said digital weight-representative signal generating means being mounted inside said second member; and arithmetic operation means receiving said digital weight-representative signals from said respective load cell modules and including weight level determining arithmetic operation means that determines the weight levels of said article as represented by said respective digital weight-representative signals.

9. The weight-based, multiple filler filling machine according to claim 8 wherein said digital weight-representative signal generating means of each load cell module is sealed inside said second member.

* * * * *

UNITED STATES PATENT AND TRADEMARK OFFICE
CERTIFICATE OF CORRECTION

PATENT NO. : 6,655,421 B2
DATED : December 2, 2003
INVENTOR(S) : Toru Kohashi et al.

It is certified that error appears in the above-identified patent and that said Letters Patent is hereby corrected as shown below:

<u>Title page,</u>
Item [*] Notice, should read as follows:
-- [*] Notice: Subject to any disclaimer, the term of this patent is extended or adjusted under 35 U.S.C. 154(b) by 0 days. --.

Signed and Sealed this

Tenth Day of February, 2004

JON W. DUDAS
*Acting Director of the United States Patent and Trademark Office*